US012809775B2

(12) United States Patent
Wang et al.

(10) Patent No.: US 12,809,775 B2
(45) Date of Patent: Nov. 24, 2026

(54) PROCESSING METHOD, ELECTRONIC DEVICE, AND STORAGE MEDIUM

(71) Applicant: Smarter Silicon (Shanghai) Technologies Co., Ltd., Shanghai (CN)

(72) Inventors: Zheng Wang, Shanghai (CN); Wanyong Guo, Shanghai (CN)

(73) Assignee: Smarter Silicon (Shanghai) Technologies Co., Ltd., Shanghai (CN)

( * ) Notice: Subject to any disclaimer, the term of this patent is extended or adjusted under 35 U.S.C. 154(b) by 4 days.

(21) Appl. No.: 19/033,396

(22) Filed: Jan. 21, 2025

(65) Prior Publication Data

US 2025/0245151 A1 Jul. 31, 2025

(30) Foreign Application Priority Data

Jan. 31, 2024 (CN) ........................ 202410139628.3

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ........................ G06F 12/0802; G06F 2212/60
See application file for complete search history.

(56) References Cited

U.S. PATENT DOCUMENTS

2004/0143748 A1* 7/2004 Yamaguchi ......... G06F 12/0802 713/193
2015/0205642 A1* 7/2015 Xu ........................ G06F 9/4881 718/105
2015/0324234 A1* 11/2015 Chang .................. G06F 9/5033 718/104
2016/0179581 A1* 6/2016 Soundararajan ...... G06F 9/5033 718/104

* cited by examiner

*Primary Examiner* — Craig S Goldschmidt
(74) *Attorney, Agent, or Firm* — ANOVA LAW GROUP, PLLC

(57) ABSTRACT

A processing method, an electronic device and a storage medium are provided in the present disclosure. The processing method includes obtaining an identifier for a first task; based on the identifier for the first task, obtaining target cache parameters of the first task corresponding to all cores of a processor, where a target cache parameter characterizes a quantity of cached data items of the first task in a cache unit corresponding to a core; and based on the target cache parameters corresponding to all cores, selecting a target core from all cores to process the first task.

19 Claims, 8 Drawing Sheets

(a)

(b)

PROCESSING METHOD, ELECTRONIC DEVICE, AND STORAGE MEDIUM

CROSS-REFERENCE TO RELATED APPLICATION

This application claims the priority of Chinese Patent Application No. 202410139628.3, filed on Jan. 31, 2024, the content of which is incorporated herein by reference in its entirety.

TECHNICAL FIELD

The present disclosure generally relates to the field of computer technology, and, more particularly, relates to a processing method, an electronic device, and a storage medium.

BACKGROUND

In a multi-core processor, each core of the processor has its own private cache. When a task runs on the core for a period of time, the core's private cache may store the task's data, and the data corresponding to the task in the private cache may not be shared between cores. When the task needs to be rescheduled to run on the core, the data in the private cache must be considered, but how to use the data in the private cache becomes a problem needs to be solved.

SUMMARY

One aspect of the present disclosure provides a processing method. The processing method includes obtaining an identifier for a first task; based on the identifier for the first task, obtaining target cache parameters of the first task corresponding to all cores of a processor, where a target cache parameter characterizes a quantity of cached data items of the first task in a cache unit corresponding to a core; and based on the target cache parameters corresponding to all cores, selecting a target core from all cores to process the first task.

Another aspect of the present disclosure provides an electronic device. The electronic device includes a cache, including a plurality of cache units; a processor, including a plurality of cores, where each core corresponds to a cache unit, and cache units corresponding to all cores are different; and a detection module, configure to detect a target cache region updated in the cache unit corresponding to each core of the processor, initiate an identifier for a target task updated, configure an identifier for a task belonging to the target cache region updated as the identifier for the target task, and record a cache parameter corresponding to each task in each core. The cache parameter characterizes a quantity of the cached data items of each task in the cache unit corresponding to each core; the processor is configured to initiate a cache parameter obtaining request to the detection module based on an identifier for a first task; the detection module is further configured to, in response to the cache parameter obtaining request, obtain target cache parameters corresponding to the first task in all cores based on the identifier for the first task; and the processor is further configured to select a target core from all cores to process the first task based on the target cache parameters corresponding to all cores.

Another aspect of the present disclosure provides a non-transitory computer-readable storage medium, containing a computer program that when being executed, causes a processor to perform a processing method. The method includes obtaining an identifier for a first task; based on the identifier for the first task, obtaining target cache parameters of the first task corresponding to all cores of a processor, where a target cache parameter characterizes a quantity of cached data items of the first task in a cache unit corresponding to a core; and based on the target cache parameters corresponding to all cores, selecting a target core from all cores to process the first task.

Other aspects of the present disclosure may be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in following description are merely some embodiments of the present disclosure. For those skilled in the art, other drawings may be obtained in accordance with these drawings without creative efforts.

DETAILED DESCRIPTION

The technical solutions in embodiments of the present disclosure are clearly and completely described below with reference to the accompanying drawings in embodiments of the present disclosure. Obviously, described embodiments are only a part of embodiments of the present disclosure, but not all embodiments. Based on embodiments in the present disclosure, all other embodiments obtained by those skilled in the art without creative efforts shall fall within the protection scope of the present disclosure.

To clearly describe above-mentioned objectives, features and advantages of the present disclosure, the present disclosure is further described in detail in combination with accompanying drawings and specific implementation methods.

Figure 1:
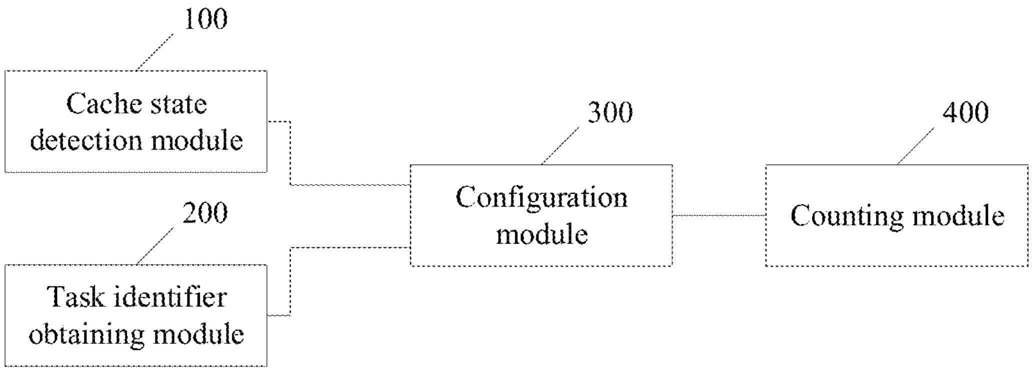
FIG. 1 illustrates a structural schematic of a detection module according to exemplary embodiment one of the present disclosure.

FIG. 1 illustrates a structural schematic of a detection module according to exemplary embodiment one of the present disclosure. Referring to FIG. 1, the detection module may include a cache state detection module 100, a task identifier obtaining module 200, a configuration module 300 and a counting module 400.

The cache state detection module 100 may be configured to detect the target cache regions updated in the cache units respectively corresponding to all cores of the processor.

In one embodiment, the processor may include a plurality of cores, and the cache units respectively corresponding to all cores may be different. The data in the cache units respectively corresponding to all cores may not be shared between the cores.

The cache status detection module 100 may detect whether the cache regions in the cache units respectively corresponding to all cores of the processor may have at least one of a write operation, a replace operation and a delete operation, thereby detecting whether the cache regions are updated. For example, a processor A may include three cores, which respectively are a core 1, a core 2 and a core 3. The core 1 may correspond to a cache unit 1; the cache unit 1 may include a cache region 11 and a cache region 12; the tasks belonging to the cache regions 11 and 12 may be both tasks A; and the cache region 11 may cache all and the cache region 12 may cache a12 and a13, where all, a12 and a13 denote cached data. The core 2 may correspond to the cache unit 2; the cache unit 2 may include a cache region 21 and a cache region 22; the tasks belonging to the cache regions 21 and 22 may be both tasks B; and the cache region 21 may cache b21, and the cache region 22 may cache b22 and b23, where b21, b22 and b23 denote cached data. The core 3 may correspond to a cache unit 3; the cache unit 3 may include a cache region 31, a cache region 32, and a cache region 33; the task belonging to the cache region 31 may be the task A, and the tasks belonging to the cache regions 32 and 33 may be both tasks B; and the cache region 31 may cache all, the cache region 32 may cache b21, and the cache region 33 may cache b24 and b25, where b24 and b25 denote cached data.

Figure 2:
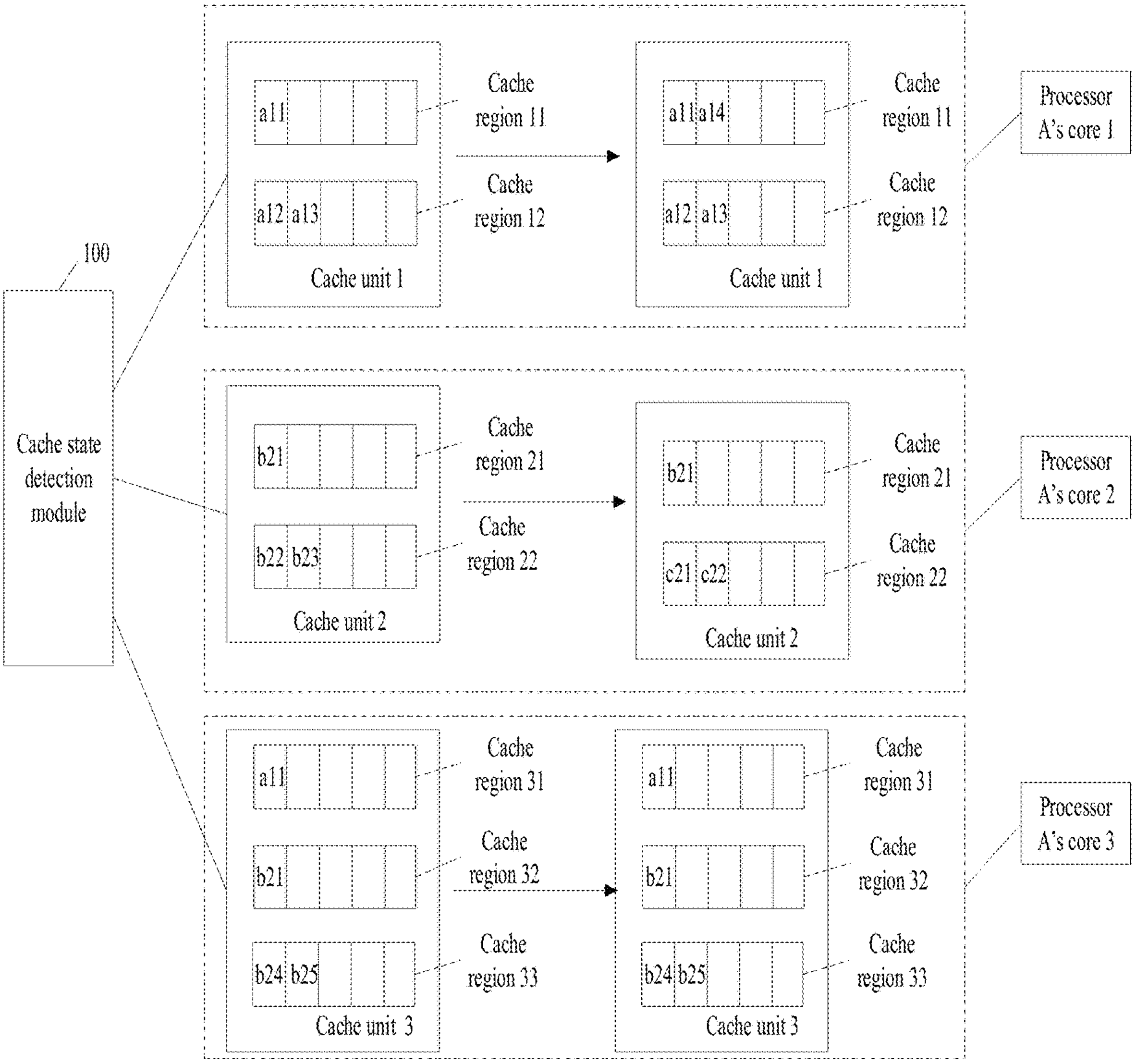
FIG. 2 illustrates a schematic of an implementation scenario of a detection module according to various embodiments of the present disclosure.

In response to that the task A writes a14 to the cache region 11, and the task C requests to replace b22 and b23 in the cache 22 with c21 and c22 of the task C, as shown in FIG. 2, the cache state detection module 100 may detect that the cache region 11 in the core 1 may have the write operation, and a14 may be newly written in the cache region 11; and may detect that the cache region 22 in the core 2 may have the replacement operation, and b22 and b23 in the cache region 22 may be replaced with c21 and c22. The cache region 11 may be the target cache region that the update occurs in the cache unit 1, and the cache region 22 may be the target cache region that the update occurs in the cache unit 2.

It should be noted that FIG. 2 may be merely exemplary, which may not limit the core of the processor and the cache unit corresponding to the core.

The task identifier obtaining module 200 may be configured to obtain the identifier for the target task that initiates a cache request to the target cache region.

It may be understood that the target task that initiates the cache request to the target cache region may be the target task that initiates update. While detecting that the cache regions in the cache units respectively corresponding to all cores of the processor have at least one of the write operation, the replace operation and the delete operation, the task that initiates the cache request for above operation may be detected, and the identifier for the task that initiates the cache request for above operation may be obtained as the identifier for the target task. For example, the task belonging to the cache region 11 in FIG. 2 may be the task A, the task A may initiate a cache request A to the cache region 11 in FIG. 2, the cache request A may be configured to write a14 into the cache region 11, and the identifier for the target task obtained by the task identifier obtaining module 200 may be the identifier for the task A; and the task belonging to the cache region 22 in FIG. 2 may be the task B, the task C may initiate a cache request B to the cache region 22 in FIG. 2, the cache request B may be configured to replace b22 and b23 in the cache region 22 with c21 and c22, and the identifier for the target task obtained by the task identifier obtaining module 200 may be the identifier for the task C that initiates the cache request B to the cache region 22.

The configuration module 300 may be configured to set the identifier for the task belonging to the target cache region as the identifier for the target task based on the detection result of the cache state detection module 100 and the identifier for the target task of the task identifier obtaining module 200.

In one embodiment, the target cache region that the update occurs may be determined based on the detection result of the cache status detection module 100, and whether the identifier for the task belonging to the target cache region is consistent with the identifier for the target task of the task identifier obtaining module 200 may be compared. In response to that the identifier for the task belonging to the target cache region is consistent with the identifier for the target task of the task identifier obtaining module 200, the identifier for the task belonging to the target cache region may remain unchanged; and in response to that the identifier for the task belonging to the target cache region is not consistent with the identifier for the target task of the task identifier obtaining module 200, the identifier for the task belonging to the target cache region may be replaced with the identifier for the target task.

For example, the task belonging to the cache region 11 in FIG. 2 may be the task A, the task A may initiate the cache request A to the cache region 11 in FIG. 2, and the cache request A may be configured to write a14 into the cache region 11. The identifier for the target task obtained by the task identifier obtaining module 200 may be the identifier for the task A, and the identifier for the task belonging to the cache region 11 may be also the identifier for the task A, such that the identifier for the task belonging to the cache region 11 may remain unchanged. In addition, the task belonging to the cache region 22 in FIG. 2 may be the task B, a task C may initiate the cache request B to the cache region 22 in FIG. 2, the cache request B may be configured to replace the data in the cache region 22, the identifier for the target task obtained by the task identifier obtaining module 200 may be the identifier for the task C that initiates the cache request B to the cache region 22, and the identifier for the task belonging to the cache region 22 may be replaced with the identifier for the task C.

The identifier for the task belonging to the target cache may be recorded in the detection module.

Figure 3:
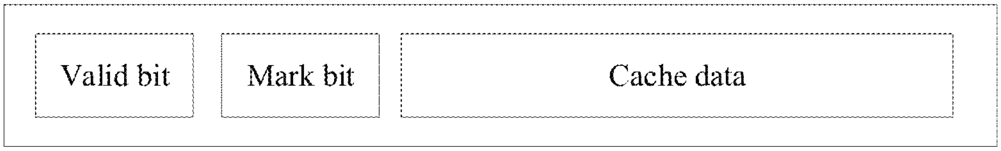
FIG. 3 illustrates another schematic of an implementation scenario of a detection module according to various embodiments of the present disclosure.
Figure 3:
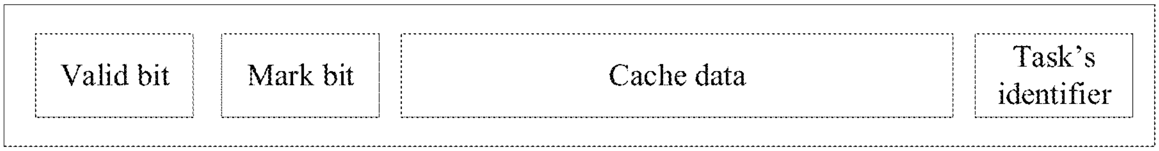
Figure 4:
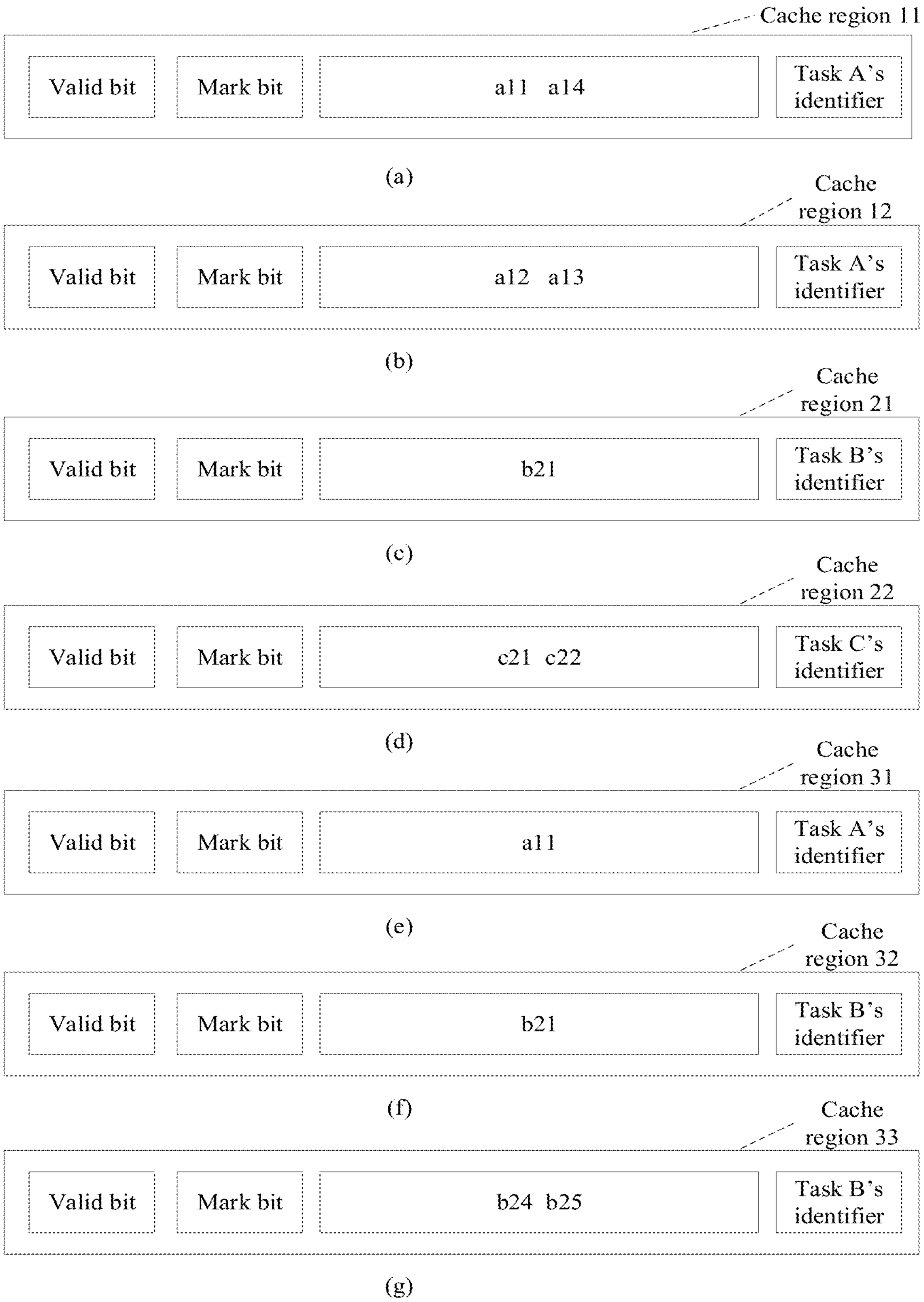
FIG. 4 illustrates another schematic of an implementation scenario of a detection module according to various embodiments of the present disclosure.

Obviously, the identifier for the task belonging to the target cache may be recorded in the target cache and in the detection module. Accordingly, the physical design of the cache may need to be modified, and the cache region after physical design modification may contain the cache region for storing the identifier for the task. For example, as shown in the part (a) of FIG. 3, before the physical design of the cache region is modified, the cache region may include a valid bit, a mark bit and cache data. As shown in the part (b)

of FIG. 3, after the physical design of the cache region is modified, the cache region may include the valid bit, the mark bit, cache data, and the task identifier. For example, corresponding to the physical design in FIG. 3, as shown in the part (a) of FIG. 4, the cache region 11 may include the identifier for the task A; as shown in the part (b) of FIG. 4, the cache region 12 may include the identifier for the task A; as shown in the part (c) of FIG. 4, the cache region 21 may include the identifier for the task B; as shown in the part (d) of FIG. 4, the cache region 22 may include the identifier for the task C; as shown in the part (e) of FIG. 4, the cache region 31 may include the identifier for the task A; as shown in the part (f) of FIG. 4, the cache region 32 may include the identifier for the task B; and as shown in the part (g) of FIG. 4, the cache region 33 may include the identifier for the task B.

In one embodiment, in response to that the detection result is that the target cache region changes from available to unavailable, the identifier for the task belonging to the target cache region may be configured as a set identifier, and the set identifier may be configured to characterize that the target cache region is unavailable.

The counting module 400 may be configured to obtain the cache parameters corresponding to all tasks in all cores based on the identifiers for the tasks belonging to all cache regions of all cores, and the cache parameters may characterize the quantity of the cached data items in the cache units corresponding to the tasks in the cores.

For example, the cache parameters corresponding to all tasks in all cores may be obtained by counting the quantity of identifiers for same task in all cores based on the identifiers for the tasks belonging to the cache regions of all cores. The cache parameters corresponding to the tasks in the cores may be recorded in a table. Accordingly, the cache parameters corresponding to the tasks in the cores may be found by a look-up table manner, thereby improving the efficiency of the tasks in the cores in obtaining corresponding cache parameters. For example, as shown in FIG. 2, the identifier for the task belonging to the cache region 11 of the core 1 may be the identifier for the task A, the identifier for the task belonging to the cache region 12 of the core 1 may be the identifier for the task A, the identifier for the task belonging to the cache region 21 of the core 2 may be the identifier for the task B, the identifier for the task belonging to the cache region 22 of the core 2 may be the identifier for the task C, the identifier for the task belonging to the cache region 31 of the core 3 may be the identifier for the task A, the identifier for the task belonging to the cache region 32 of the core 3 may be the identifier for the task B, and the identifier for the task belonging to the cache region 33 of the core 3 may be the identifier for the task B. The identifier for the task A may be labeled as pid0, the identifier for the task B may be labeled as pid1, and the identifier for the task C may be labeled as pid2.

As shown in Table 1, the quantity of the identifiers for the task A in the core 1 is 2, and the cache parameter A11 corresponding to the task A in the core 1 is 2, which may characterize the quantity of the cached data items of the task A in the cache unit corresponding to the core 1.

TABLE 1

| Task in the core 1 | Cache parameter |
|---|---|
| pid0 | A11 (2) |

As shown in Table 2, the quantity of the identifiers for the task B in the core 2 is 1, and the cache parameter B22 corresponding to the task B in the core 2 is 1, which may characterize the quantity of the cached data items of the task B in the cache unit corresponding to the core 2; and the quantity of the identifiers for the task C in the core 2 is 1, and the cache parameter C22 corresponding to the task C in the core 2 is 1, which may characterize the quantity of the cached data items of the task C in the cache unit corresponding to the core 2.

TABLE 2

| Task in the core 2 | Cache parameter |
|---|---|
| pid1 | B22 (1) |
| pid2 | C22 (1) |

As shown in Table 3, the quantity of identifiers for the task A in the core 3 is 1, and the cache parameter A33 corresponding to the task A in the core 3 is 1, which may characterize the quantity of the cached data items of the task A in the cache unit corresponding to the core 3; and the quantity of identifiers for the task B in the core 3 is 2, and the cache parameter B33 corresponding to the task B in the core 3 is 2, which may characterize the quantity of the cached data items of the task B in the cache unit corresponding to the core 3.

TABLE 3

| Task in the core 3 | Cache parameter |
|---|---|
| pid0 | A33 (1) |
| pid1 | B33 (2) |

In one embodiment, the identifiers for the tasks belonging to all cache regions of all cores may come from the identifiers for the tasks recorded in the detection module; and/or, from the identifiers for the tasks recorded in all cache regions of all cores.

In one embodiment, the cache state detection module 100 may be configured to detect the target cache regions updated in the cache units respectively corresponding to all cores of the processor; the task identifier obtaining module 200 may be configured to obtain the identifier for the target task that initiates a cache request to the target cache region; the configuration module 300 may be configured to set the identifier for the task belonging to the target cache region as the identifier for the target task based on the detection result of the cache state detection module 100 and the identifier for the target task of the task identifier obtaining module 200; and the counting module 400 may be configured to obtain the cache parameters corresponding to all tasks in all cores based on the identifiers for the tasks belonging to all cache regions of all cores, and the cache parameters may characterize the quantity of the cached data items in the cache units corresponding to the tasks in the cores, which may implement tracking of the quantity of the cached data items of the tasks in all cores based on the hardware module (i.e., the detection module), thereby utilizing the data in the cache units corresponding to the cores, providing reference cache parameters for task scheduling, and reducing the software code overhead of the task scheduling.

Figure 5:
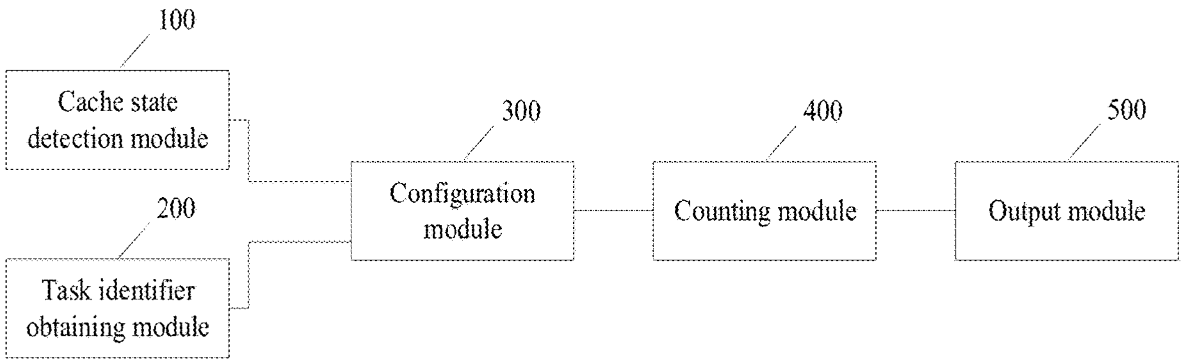
FIG. 5 illustrates a structural schematic of a detection module according to exemplary embodiment two of the present disclosure.

In another embodiment of the present disclosure, FIG. 5 illustrates a structural schematic of a detection module according to exemplary embodiment two of the present disclosure. As shown in FIG. 5, the detection module may include the cache state detection module 100, the task identifier obtaining module 200, the configuration module 300, the counting module 400 and an output module 500.

The cache state detection module 100, the task identifier obtaining module 200, the configuration module 300, and the counting module 400 may refer to relevant description in exemplary embodiment one, which may not be described in detail herein.

The output module 500 may be configured to obtain and output the target cache parameter corresponding to the first task from the counting module in response to the cache parameter obtaining request for the first task, and the target cache parameter may be at least configured as the reference factor for scheduling the first task to corresponding core.

For example, the output module 500 may obtain the cache parameter corresponding to the identifier for the first task from the counting module 400 in response to the cache parameter obtaining request for the first task, and the cache parameter may be configured as the target cache parameter corresponding to the first task.

Corresponding to the output module 500, the first register and the second register may be provided, the first register may be configured to input the task identifier, and the second register may be configured to output the cache parameter. Accordingly, in response to that the first task initiates the cache parameter obtaining request, the identifier for the first task may be written to the first register, and the output module 500 may obtain the identifier for the first task from the first register. Therefore, the cache parameter corresponding to the identifier for the first task may be obtained from the counting module 400 as the target cache parameter, and the target cache parameter may be written into the second register to output the target cache parameter.

In one embodiment, through the output module 500, in response to the cache parameter obtaining request for the first task, the target cache parameters corresponding to the first task may be obtained from the counting module 400 for output, such that, the cache parameter user may obtain the target cache parameter in time, thereby improving real-time performance of usage of the cache parameter usage participant. For example, the output module 400 may output the target cache parameters corresponding to the first task, such that the task scheduling participant may refer to the target cache parameter and schedule the first task to corresponding core, thereby improving the real-time performance of scheduling of the first task.

Figure 6:
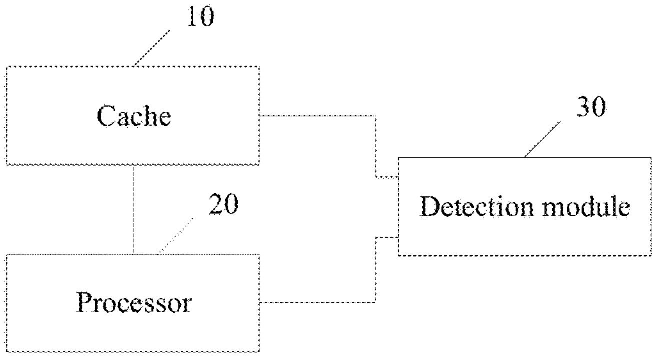
FIG. 6 illustrates a structural schematic of an electronic device according to exemplary embodiment three of the present disclosure.

In another embodiment of the present disclosure, FIG. 6 illustrates a structural schematic of an electronic device according to exemplary embodiment three of the present disclosure. As shown in FIG. 6, the electronic device may include a cache 10, a processor 20, and a detection module 30.

The cache 10 may include a plurality of cache units.

The processor 20 may include a plurality of cores, each core may correspond to a cache unit, and the cache units corresponding to all cores may be different.

The detection module 30 may be configured to detect the target cache regions updated in the cache units respectively corresponding to all cores of the processor 20, initiate the identifier for the target task updated, set the identifier for the task belonging to the target cache region as the identifier for the target task, and record the cache parameter corresponding to each task in each core.

The cache parameter may characterize the quantity of the cached data items of the task in the cache unit corresponding to the core.

In one embodiment, the detection module 30 may detect the target cache regions updated in the cache units respectively corresponding to all cores of the processor 20, initiate the identifier for the target task updated, set the identifier for the task belonging to the target cache region as the identifier for the target task, and record the cache parameter corresponding to each task in each core; and above-mentioned process may refer to relevant description in exemplary embodiment one and may not be described in detail herein.

The processor 20 may be configured to initiate the cache parameter obtaining request to the detection module 30 based on the identifier for the first task.

In response to that the first task needs to be processed, the processor 20 may schedule the first task to one of the plurality of cores. The first task may be scheduled based on a scheduling strategy related to the cache. For example, the first task may be scheduled based on the cache parameter corresponding to the first task in the core. Accordingly, the processor 20 may initiate the cache parameter obtaining request to the detection module 30, thereby obtaining corresponding cache parameter.

The detection module 30 may be also configured to, in response to the cache parameter obtaining request, obtain the target cache parameter corresponding to the first task in each core based on the identifier for the first task.

The process of the detection module 30 for obtaining the target cache parameter corresponding to the first task in each core based on the identifier for the first task may refer to relevant description in exemplary embodiment one, which may not be described in detail herein.

The processor 20 may be further configured to select a target core from all cores to process the first task based on target cache parameters corresponding to all cores.

In one embodiment, the detection module 30 may detect the target cache regions updated in the cache units respectively corresponding to all cores of the processor 20, initiate the identifier for the target task updated, set the identifier for the task belonging to the target cache region as the identifier for the target task, and record the cache parameter corresponding to each task in each core; and the processor 20 may interact with the detection module 30 to obtain the target cache parameter corresponding to the first task in each core. In such way, the processor 20 may accurately obtain actual situation of the quantity of the cached data items of the first task on each core. As disclosed above, the processor 20 may select the target core from all cores to process the first task based on the target cache parameters corresponding to all cores, which may reduce the pressure on memory access and improve system performance.

Subsequently, a processing method is provided in the present disclosure. The processing method described below may refer to the detection module described above.

Figure 7:
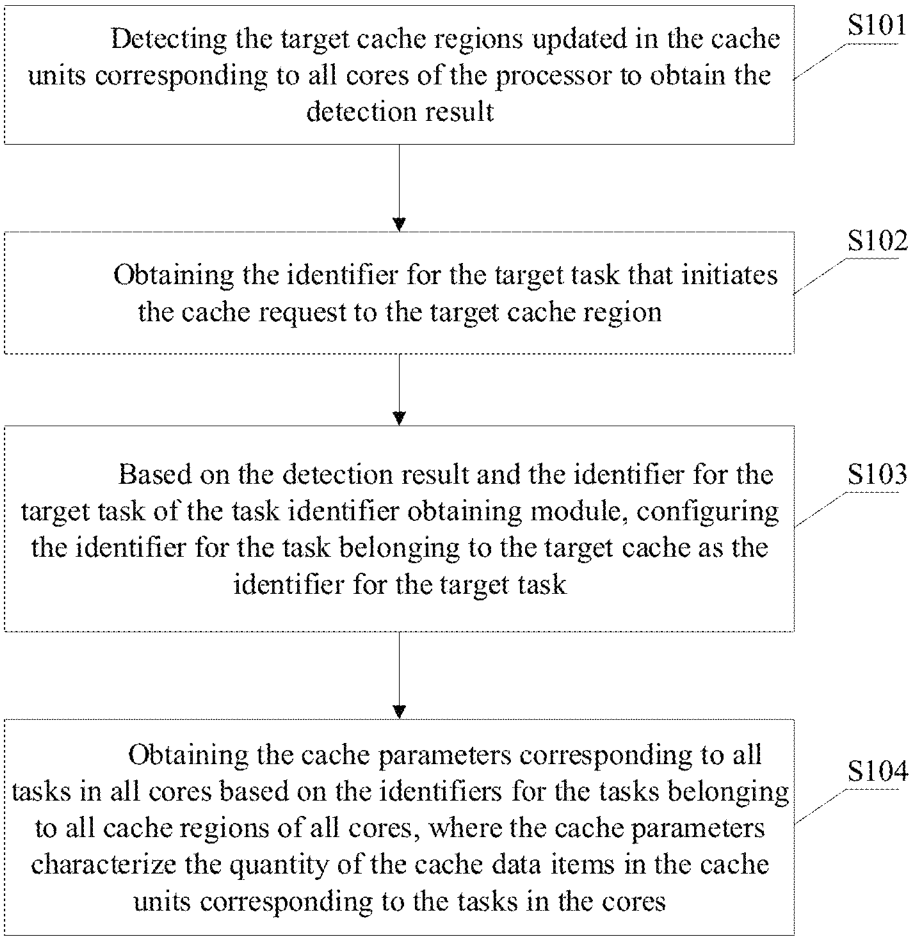
FIG. 7 illustrates a flowchart of a processing method according to exemplary embodiment three of the present disclosure.

Referring to FIG. 7, FIG. 7 illustrates a flowchart of a processing method according to exemplary embodiment three of the present disclosure. The processing method may be applied to the detection module. As shown in FIG. 7, the method may include, but may not be limited to, following exemplary steps.

At S101, the target cache regions updated in the cache units corresponding to all cores of the processor may be detected to obtain the detection result.

In one embodiment, the processor may include the plurality of cores, and the cache units corresponding to all cores may be different.

For example, it may detect that the cache regions in the cache units respectively corresponding to all cores of the processor have at least one of the write operation, the replace operation and the delete operation, thereby detecting whether the cache regions are updated.

At S102, the identifier for the target task that initiates the cache request to the target cache region may be obtained.

It may be understood that the target task that initiates the cache request to the target cache region may be the target task that initiates update. While detecting that the cache regions in the cache units respectively corresponding to all cores of the processor have at least one of the write operation, the replace operation and the delete operation, the task that initiates the cache request for above operation may be detected, and the identifier for the task that initiates the cache request for above operation may be obtained as the identifier for the target task.

At S103, based on the detection result and the identifier for the target task of the task identifier obtaining module, the identifier for the task belonging to the target cache may be configured as the identifier for the target task.

In one embodiment, based on the detection result, the identifier for the target cache region and the task belonging to the target cache region may be determined to be updated, and the identifier for the task belonging to the target cache region, and the identifier for the target task may be compared to determine whether two identifiers are consistent.

In one embodiment, the target cache region that the update occurs may be determined based on the detection result, and whether the identifier for the task belonging to the target cache region is consistent with the identifier for the target task may be compared.

In response to that the identifier for the task belonging to the target cache region is consistent with the identifier for the target task, the identifier for the task belonging to the target cache region may remain unchanged.

In response to that the identifier for the task belonging to the target cache region is not consistent with the identifier for the target task, the identifier for the task belonging to the target cache region may be replaced with the identifier for the target task.

The identifier for the task belonging to the target cache may be recorded in the detection module.

Obviously, the identifier for the task belonging to the target cache may be recorded in the target cache and in the detection module. Accordingly, the physical design of the cache may need to be modified, and the cache region after physical design modification may contain the cache region for storing the identifier for the task.

At S104, the cache parameters corresponding to all tasks in all cores may be obtained based on the identifiers for the tasks belonging to all cache regions of all cores, and the cache parameters may characterize the quantity of the cached data items in the cache units corresponding to the tasks in the cores.

For example, the cache parameters corresponding to all tasks in all cores may be obtained by counting the quantity of identifiers for same task in all cores based on the identifiers for the tasks belonging to the cache regions of all cores. The cache parameters corresponding to the tasks in the cores may be recorded in a table. Accordingly, the cache parameters corresponding to the tasks in the cores may be found by a look-up table manner, thereby improving the efficiency of the tasks in the cores in obtaining corresponding cache parameters.

In one embodiment, the identifiers for the tasks belonging to all cache regions of all cores may come from the identifiers for the tasks recorded in the detection module; and/or, from the identifiers for the tasks recorded in all cache regions of all cores.

In one embodiment, the detection module may be configured to detect the target cache regions updated in the cache units respectively corresponding to all cores of the processor; obtain the identifier for the target task that initiates the cache request to the target cache region; set the identifier for the task belonging to the target cache region as the identifier for the target task based on the detection result and the identifier for the target task of the task identifier obtaining module; and obtain the cache parameters corresponding to all tasks in all cores based on the identifiers for the tasks belonging to all cache regions of all cores, and the cache parameters may characterize the quantity of the cached data items in the cache units corresponding to the tasks in the cores, which may implement tracking of the quantity of the cached data items of the tasks in all cores based on the hardware module (i.e., the detection module), thereby utilizing the data in the cache units corresponding to the cores, providing reference cache parameters for task scheduling, and reducing the software code overhead of the task scheduling.

In another embodiment of the present disclosure, a processing method is provided. The processing method provided in exemplary embodiment four of the present disclosure may include, but may not be limited to, following exemplary steps.

At S201, the target cache regions updated in the cache units corresponding to all cores of the processor may be detected to obtain the detection result.

At S202, the identifier for the target task that initiates the cache request to the target cache region may be obtained.

At S203, based on the detection result and the identifier for the target task of the task identifier obtaining module, the identifier for the task belonging to the target cache may be configured as the identifier for the target task.

At S204, the cache parameters corresponding to all tasks in all cores may be obtained based on the identifiers for the tasks belonging to all cache regions of all cores, and the cache parameters may characterize the quantity of the cached data items in the cache units corresponding to the tasks in the cores.

The detailed process of S204 may refer to relevant description of S101-S104 in exemplary embodiment three, which may not be described in detail herein.

At S205, in response to the cache parameter obtaining request for the first task, the target cache parameter corresponding to the first task may be obtained and outputted, and the target cache parameter may be at least configured as the reference factor for scheduling the first task to corresponding core.

For example, the output module may obtain the cache parameter corresponding to the identifier for the first task in response to the cache parameter obtaining request for the first task, and such cache parameter may be configured as the target cache parameter corresponding to the first task.

In one embodiment, by responding to the cache parameter obtaining request for the first task, the target cache parameter corresponding to the first task may be obtained from the counting module for output, the cache parameter user may obtain the target cache parameter in time, thereby improving the real-time performance of the cache parameter usage participant. For example, the target cache parameter corresponding to the first task may be outputted, which may make the task scheduling participant to refer to the target cache parameter and schedule the first task to corresponding core, thereby improving the real-time scheduling performance of the first task.

Subsequently, a processing method provided by the present disclosure is described. The processing method described below may refer to the electronic device described above.

Figure 8:
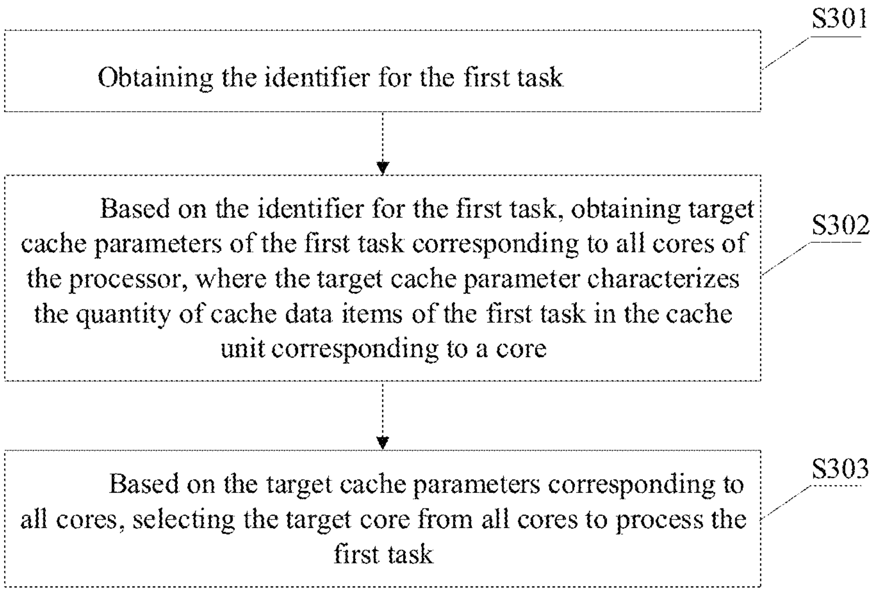
FIG. 8 illustrates a flowchart of a processing method according to exemplary embodiment five of the present disclosure.

Referring to FIG. 8, FIG. 8 illustrates a flowchart of a processing method according to exemplary embodiment five of the present disclosure. The processing method may be applied to a processor. As shown in FIG. 8, the method may include, but may be not limited to, following exemplary steps.

At S301, the identifier for the first task may be obtained.

The first task may be a task to be processed. The identifier for the first task may characterize the first task.

At S302, based on the identifier for the first task, the target cache parameters corresponding to all cores of the processor for the first task may be obtained; and the target cache parameter may characterize the quantity of the cached data items in the cache unit corresponding to the core for the first task.

In one embodiment, the identifier for the first task may be written into the first register, and the detection module may read the identifier for the first task from the first register. The detection module may search for the cache parameter corresponding to the identifier for the first task in the cache parameters corresponding to all tasks recorded in all cores.

In response to that the cache parameter corresponding to the identifier for the first task is found, the cache parameter corresponding to the identifier for the first task may be configured as the target cache parameter.

In response to that the cache parameter corresponding to the identifier for the first task is not found, it indicates that the core may not contain the cache data of the first task. A preset cache parameter may be configured as the target cache parameter, and the preset cache parameter may be configured to characterize that the quantity of the cached data items of the first task in the cache unit corresponding to the core may be 0.

The detection module may write the target cache parameter corresponding to the first task in each core into the second register, and the processor may read the target cache parameter corresponding to the first task in each core of the processor from the second register.

At S303, based on the target cache parameters corresponding to all cores, the target core may be selected from all cores to process the first task.

The quantity of the cached data items corresponding to the first task in the target core may satisfy certain requirements to reduce the pressure on memory access.

In one embodiment, the processor may obtain the identifier for the first task; and based on the identifier for the first task, may obtain the target cache parameters corresponding to the first task in all cores of the processor, such that the processor may accurately obtain actual situation of the quantity of the cached data items of the first task on each core. As disclosed above, the processor may select the target core from all cores to process the first task based on the target cache parameters corresponding to all cores, which may reduce the pressure on memory access and improve system performance.

Figure 9:
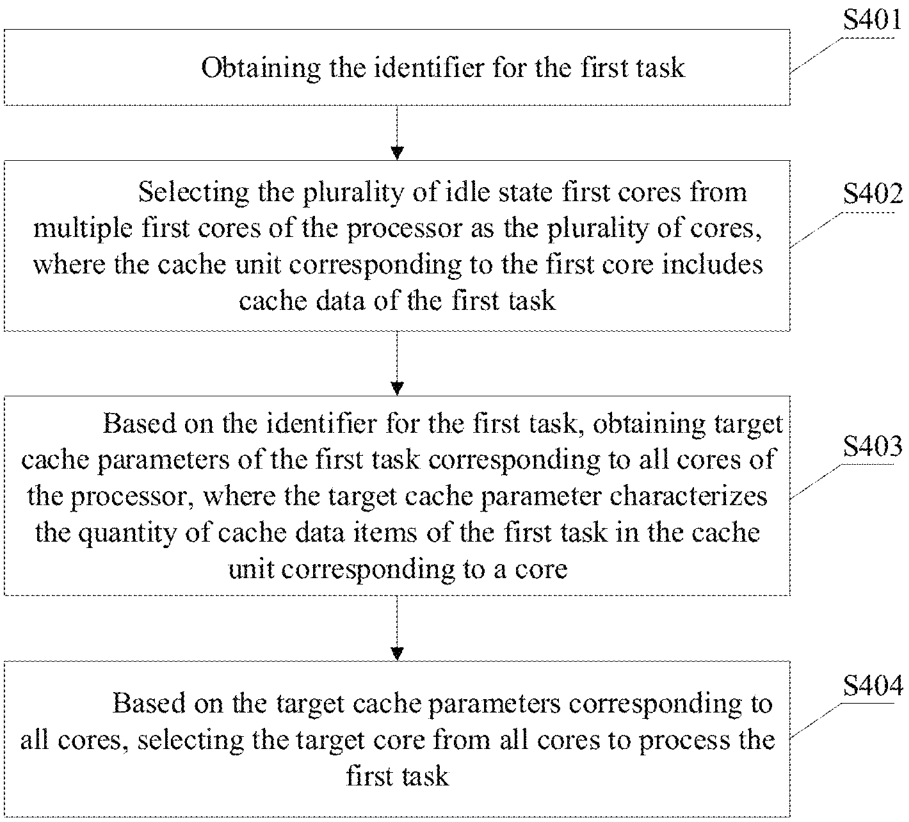
FIG. 9 illustrates a flowchart of a processing method according to exemplary embodiment six of the present disclosure.

In another embodiment of the present disclosure, referring FIG. 9, FIG. 9 illustrates a flowchart of a processing method according to exemplary embodiment six of the present disclosure. Referring to FIG. 9, the method may include, but may be not limited to, following exemplary steps.

At S401, the identifier for the first task may be obtained.

At S402, a plurality of idle state first cores selected from multiple first cores of the processor may be configured as a plurality of cores, and the cache unit corresponding to the first core may include the cache data of the first task.

The first task may be scheduled to the first core in an idle state. The first task may be the first task to be processed. As the first task to be processed, the cache data of the first task in the cache unit corresponding to the first core may be not overwritten.

At S403, based on the identifier for the first task, the target cache parameters corresponding to all cores of the processor for the first task may be obtained; and the target cache parameter may characterize the quantity of the cached data items in the cache unit corresponding to the core for the first task.

It may be understood that in one embodiment, the cache unit corresponding to each of the plurality of cores may include the cache data of the first task; and accordingly, the quantity of the cached data items of the first task characterized by the target cache parameter in the cache unit corresponding to the core may be not 0.

At S404, based on the target cache parameters corresponding to all cores, the target core may be selected from all cores to process the first task.

In one embodiment, the processor may obtain the identifier for the first task and select the plurality of idle state first cores from multiple first cores of the processor which is configured as a plurality of cores, and the cache unit corresponding to the first core may include the cache data of the first task; and based on the identifier for the first task, the processor may obtain the target cache parameters corresponding to the first task in all cores of the processor, such that the processor may accurately obtain actual situation of the quantity of the cached data items of the first task on each core. As disclosed above, the processor may select the target core from all cores to process the first task based on the target cache parameters corresponding to all cores, which may reduce the pressure on memory access and improve system performance. Furthermore, the first task may be the task first processed by the target core, which may ensure the efficiency of the first task processing.

In another embodiment of the present disclosure, a processing method is provided. The processing method provided in exemplary embodiment seven of the present disclosure may include, but may not be limited to, following exemplary steps.

At S501, the identifier for the first task may be obtained.

At S502, a plurality of idle state first cores selected from multiple first cores of the processor may be configured as a plurality of cores, and the cache unit corresponding to the first core may include the cache data of the first task.

At S503, in response to that none of multiple first cores of the processor are in an idle state, a plurality of first cores that the first performance parameters meet the performance requirements of the first task may be selected from multiple first cores as the plurality of cores.

For example, multiple first cores that at least one first performance parameter among the processing rate parameter, load parameter and working frequency meets at least one performance requirement of accuracy and efficiency of the first task may be selected as the plurality of first cores.

The cache unit corresponding to the first core may include the cache data of the first task.

It should be noted that S502 and S503 may correspond to two different implementation scenarios. After S501, S502 or S503 may be executed instead of S502 and S503.

At S504, based on the identifier for the first task, the target cache parameters corresponding to all cores of the processor for the first task may be obtained; and the target cache parameter may characterize the quantity of the cached data items in the cache unit corresponding to the core for the first task.

It may be understood that in one embodiment, the cache unit corresponding to each of the plurality of cores may include the cache data of the first task; and accordingly, the quantity of the cached data items of the first task characterized by the target cache parameter in the cache unit corresponding to the core may be not 0.

At S505, based on the target cache parameters corresponding to all cores, the target core may be selected from all cores to process the first task.

Corresponding to S502, the target core may be selected from all idle state cores to process the first task, such that the target core may first process the first task, which may ensure the processing efficiency of the first task.

Corresponding to S503, the target core may be selected from all cores that the first performance parameter meets the performance requirement of the first task and configured to process the first task, which may ensure the processing effect of the first task, such as the accuracy and/or efficiency of the first task processing.

As another embodiment of the present disclosure, a processing method is provided in exemplary embodiment seven of the present disclosure. A detailed solution of S505 in exemplary embodiment seven is described in one embodiment. S505 may include, but may be not limited to, following exemplary steps.

At S5051, based on the target cache parameters corresponding to the first task in all cores, the core with the largest quantity of the cached data items corresponding to the target cache parameters from all cores may be selected as the target core.

In one embodiment, the quantities of the cache data characterized by the target cache parameters corresponding to all cores of the first task may be compared or sorted, and the core with the largest quantity of the cached data items corresponding to the target cache parameter may be selected from all cores.

In one embodiment, corresponding to S502, the core with the largest quantity of the cached data items corresponding to the target cache parameter may be selected from all idle state cores as the target core to process the first task, such that the target core may first process the first task, which may ensure the processing efficiency of the first task, minimize the quantity of memory accesses and improve system performance.

Corresponding to S503, the core with the largest quantity of the cached data items corresponding to the target cache parameter may be selected from the cores that the first performance parameters meet the performance requirements of the first task and configured as the target core to process the first task, which may ensure the processing effect of the first task, such as the accuracy and/or efficiency of the first task processing, and minimize the quantity of memory accesses and improve system performance.

As another embodiment of the present disclosure, a processing method is provided in exemplary embodiment nine of the present disclosure. A detailed solution of S505 in exemplary embodiment seven is described in one embodiment. S505 may include, but may be not limited to, following exemplary steps.

At S5052, the second performance parameter of the core with the largest quantity of the cached data items corresponding to the target cache parameter and the second performance parameter of each second core in the processor may be obtained.

In one embodiment, each second core may be selected from multiple cores of the processor based on a performance scheduling strategy, and the first performance parameter of each second core may satisfy the performance requirement of the first task.

Corresponding to S503, the first performance parameter of the core with the largest quantity of the cached data items corresponding to the target cache parameter may also satisfy the performance requirement of the first task.

The first performance parameter may be different from the second performance parameter. For example, the second performance parameter may be, but may be not limited to, characterizing at least one of the power consumption and temperature of the core.

At S5053, in response to that the performance characterized by the second performance parameter of the core with the largest quantity of the cached data items corresponding to the target cache parameter is better than the performance characterized by the second performance parameter of each second core, the core with the largest quantity of the cached data items corresponding to the target cache parameter may be configured as the target core.

For example, when the power consumption of the core characterized by the second performance parameter of the core with the largest quantity of the cached data items corresponding to the target cache parameter may be compared with the power consumption of the core characterized by the second performance parameter of each second core, in response to that the power consumption saved by the core with the largest quantity of the cached data items corresponding to the target cache parameter is higher than a power consumption threshold, the core with the largest quantity of the cached data items corresponding to the target cache parameter may be configured as the target core.

The power consumption threshold may be set as needed, which may be not limited in the present disclosure.

Or in response to that the temperature of the core characterized by the second performance parameter of the core with the largest quantity of the cached data items corresponding to the target cache parameter is lower than the temperature of the core characterized by the second performance parameter of each second core, the core with the largest quantity of the cached data items corresponding to the target cache parameter may be configured as the target core.

Or when the power consumption of the core characterized by the second performance parameter of the core with the largest quantity of the cached data items corresponding to the target cache parameter may be compared with the power consumption of the core characterized by the second performance parameter of each second core, in response to that the power consumption saved by the core with the largest quantity of the cached data items corresponding to the target cache parameter is higher than a power consumption threshold, and in response to that the temperature of the core characterized by the second performance parameter of the core with the largest quantity of the cached data items corresponding to the target cache parameter is lower than the temperature of the core characterized by the second performance parameter of each second core, the core with the largest quantity of the cached data items corresponding to the target cache parameter may be configured as the target core.

Obviously, in response to that the performance characterized by the second performance parameter of a second core in all second cores is better than the performance characterized by the second performance parameter of the core with the largest quantity of the cached data items corresponding to the target cache parameter, the second core with better performance characterized by the second performance parameter may be configured as the target core.

In one embodiment, on the basis that the first performance parameter of each core of the processor satisfies the performance requirements of the first task, the second performance parameters of the core with the largest quantity of the cached data items corresponding to the target cache parameter and the second performance parameter of each second core in the processor may be obtained. In response to that the performance characterized by the second performance parameter of the core with the largest quantity of the cached data items corresponding to the target cache parameter is better than the performance characterized by the second performance parameter of each second core, the core with the largest quantity of the cached data items corresponding to the target cache parameter may be configured as the target core, such that the first performance parameter of the target core may satisfy the performance requirements of the first task. Moreover, the performance characterized by the second performance parameter of the target core may be desirable, which may ensure the performance of the target core is desirable. On such basis, the first task may be processed by the target core, which may make the processing effect of the first task desirable.

As another embodiment of the present disclosure, a processing method is provided in exemplary embodiment ten of the present disclosure. The method may include, but may be not limited to, following exemplary steps.

At S601, the identifier for the first task may be obtained.

At S602, based on the identifier for the first task, the target cache parameters corresponding to all cores of the processor for the first task may be obtained; and the target cache parameter may characterize the quantity of the cached data items in the cache unit corresponding to the core for the first task.

At S603, based on the target cache parameters corresponding to all cores, the target core may be selected from all cores to process the first task.

Detailed process of S601-S603 may refer to relevant description of S301-S303 in exemplary embodiment five, which may not be described in detail herein.

At S604, the processing priority parameter of the first task may be obtained.

In one embodiment, the processing priority parameter of the first task may be determined according to the importance of the first task; and the higher the importance is, the higher corresponding processing priority is.

The importance of the first task may be determined by the processor or inputted to the processor by the application to which the first task belongs.

At S605, in response to determination that based on the processing priority parameter, the processing priority of the first task satisfies a set execution condition, the target core may be controlled to process the first task preferentially.

Determination that based on the processing priority parameter, the processing priority of the first task satisfies the set execution condition may include, but may be not limited to, that the first task is a task to be processed in the target core, and the processing priority of the first task may be determined to be higher than the processing priorities of other tasks to be processed in the target core based on the processing priority parameter; or the first task is a task to be processed in the target core, and the processing priority of the first task may be determined to be higher than the processing priorities of all other tasks in the target core based on the processing priority parameter. All other tasks in the target core may include other tasks to be processed in the target core and tasks being processed in the target core.

In embodiments of the present disclosure, the processing priority parameter of the first task may be obtained; and in response to determination that based on the processing priority parameter, the processing priority of the first task satisfies the set execution condition, the target core may be controlled to preferentially process the first task, which may reduce the waiting time for the first task in the target core and prevent the cache data of the first task from being overwritten by the cache data of previously executed task, thereby effectively utilizing the cache data in the target core to process the first task.

It should be noted that each embodiment focuses on the differences from other embodiments, and same or similar parts between various embodiments may refer to each other. Since apparatus embodiments are basically similar to method embodiments, the description of apparatus embodiments may be relatively simple, and relevant parts may refer to partial description of method embodiments.

Various embodiments of the present disclosure further provide a non-transitory computer-readable storage medium, containing a computer program that when being executed, causes a processor to perform a processing method. The method includes obtaining an identifier for a first task; based on the identifier for the first task, obtaining target cache parameters of the first task corresponding to all cores of a processor, where a target cache parameter characterizes a quantity of cached data items of the first task in a cache unit corresponding to a core; and based on the target cache parameters corresponding to all cores, selecting a target core from all cores to process the first task.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "comprise" or any other variation thereof may be intended to cover a non-exclusive inclusion. Therefore, a process, a method, an article or an apparatus that includes a list of elements may include not only those elements, but also include other elements not expressly listed or elements which are inherent to the process, the method, the article or the apparatus. Without further limitation, an element defined by the statement "comprises a . . . " may not exclude the presence of additional identical elements in a process, a method, an article or an apparatus that includes such element.

For the convenience of description, above-mentioned apparatuses may be described in various modules according to functions. Obviously, when implementing the present disclosure, the functions of each module may be implemented in same or multiple software and/or hardware.

It may be seen from description of above-mentioned implementation manners that those skilled in the art may clearly understand that the present disclosure may be implemented by means of software and necessary general hardware platform. Based on such understanding, the essence of the technical solution of the present disclosure, or a part of the technical solution which may contribute to the existing technology may be embodied in the form of a software product. The computer software product may be stored in a storage medium, such as ROM/RAM, a magnetic disk, an optical disk or the like; and may include a plurality of instructions for enabling a computer device (which may be a personal computer, a server, a network device or the like) to execute methods described in various embodiments or certain parts of embodiments of the present disclosure.

The above is a detailed description of the detection module, the electronic device and the processing method provided by the present disclosure. Certain embodiments may be configured to illustrate the principles and implementation manners of the present disclosure. The description of above-mentioned embodiments may be only used to help understand methods and core ideas of the present disclosure. Meanwhile, according to the concept of the present disclosure, those skilled in the art may change implementation manners and application scopes. The description of the present disclosure should not be understood as limiting the present disclosure.

What is claimed is:

1. A processing method, comprising:

obtaining an identifier for a first task;

based on the identifier for the first task, obtaining target cache parameters of the first task corresponding to all cores of a processor, wherein a target cache parameter characterizes a quantity of cached data items of the first task in a cache unit corresponding to a core, the cache unit corresponding to each core comprises a plurality of cache regions, each cache region storing an identifier of a task to which the cache region belongs, and the quantity of cached data items of the first task in the cache unit corresponding to the core is a quantity of cache regions, in the cache unit corresponding to the core, that store the identifier for the first task; and based on the target cache parameters corresponding to all cores, selecting a target core from all cores to process the first task.

2. The method according to claim 1, further including:

in response to a plurality of first cores of multiple first cores of the processor being in an idle state, selecting the plurality of idle state first cores from the multiple first cores as a plurality of cores, wherein a cache unit corresponding to a first core includes cache data of the first task.

3. The method according to claim 2, further including:

in response to none of the multiple first cores of the processor being in the idle state, selecting a second plurality of first cores, with first performance parameters satisfying a performance requirement of the first task, from the multiple first cores as the plurality of cores.

4. The method according to claim 3, wherein based on the target cache parameters corresponding to all cores, selecting the target core from all cores to process the first task includes:

based on the target cache parameters of the first task corresponding to all cores, selecting a core with a target cache parameter corresponding to a largest quantity of the cached data items from all cores as the target core.

5. The method according to claim 4, further including:

obtaining a second performance parameter of the core with the target cache parameter corresponding to the largest quantity of the cached data items and a second performance parameter of each of a plurality of second cores in the processor, wherein the plurality of second cores are selected from the processor based on a performance scheduling strategy, a first performance parameter of each second core satisfies the performance requirement of the first task, the second performance parameter is different from the first performance parameter, wherein performance characterized by the second performance parameter of the core with the target cache parameter corresponding to the largest quantity of the cached data items is better than performance characterized by the second performance parameter of each second core.

6. The method according to claim 1, further including:

obtaining a processing priority parameter of the first task; and in response to a determination that the processing priority of the first task satisfies a set execution condition based on the processing priority parameter, controlling the target core to process the first task with priority.

7. The method according to claim 1, wherein the identifier of the task to which a cache region belongs is set, in response to detecting that the cache region is updated, to an identifier of a task that initiates a cache request causing the cache region to be updated.

8. An electronic device, comprising:

a cache, including a plurality of cache units;

one or more processors each including a plurality of cores, wherein each core corresponds to a cache unit, and cache units corresponding to all cores are different; and a detection module, configured to, for each core of the one or more processors: detect a target cache region that is updated in the cache unit corresponding to the core; obtain an identifier of a target task that initiates a cache request causing the target cache region to be updated; and set an identifier of a task to which the target cache region belongs as the identifier of the target task; the detection module being further configured to record, for each task having cache data in the cache unit corresponding to the core, a respective cache parameter, wherein:

the respective cache parameter characterizes a quantity of cached data items of the task in the cache unit corresponding to the core;

the one or more processors are configured to initiate a cache parameter obtaining request to the detection module based on an identifier for a first task;

the detection module is further configured to, in response to the cache parameter obtaining request, obtain target cache parameters corresponding to the first task in all cores based on the identifier for the first task; and the one or more processors are further configured to select a target core from all cores to process the first task based on the target cache parameters corresponding to all cores.

9. The electronic device according to claim 8, wherein the one or more processors are further configured to:

in response to a plurality of first cores of multiple first cores of the processor being in an idle state, select the plurality of idle state first cores from the multiple first cores as a plurality of cores, wherein a cache unit corresponding to a first core includes cache data of the first task.

10. The electronic device according to claim 9, wherein the one or more processors are further configured to:

in response to none of the multiple first cores of the processor being in an idle state, select a second plurality of first cores, with first performance parameters satisfying a performance requirement of the first task, from the multiple first cores as the plurality of cores.

11. The electronic device according to claim 10, wherein the one or more processors are further configured to:

based on the target cache parameters of the first task corresponding to all cores, select a core with a target cache parameter corresponding to a largest quantity of the cached data items from all cores as the target core.

12. The electronic device according to claim 11, wherein the one or more processors are further configured to:

obtain a second performance parameter of the core with the target cache parameter corresponding to the largest quantity of the cached data items and a second performance parameter of each of a plurality of second cores in the processor, wherein the plurality of second cores are selected from the processor based on a performance scheduling strategy, a first performance parameter of each second core satisfies the performance requirement of the first task, the second performance parameter is different from the first performance parameter;

wherein performance characterized by the second performance parameter of the core with the target cache parameter corresponding to the largest quantity of the cached data items is better than performance characterized by the second performance parameter of each second core.

13. The electronic device according to claim 8, wherein the one or more processors are further configured to:

obtain a processing priority parameter of the first task; and in response to a determination that the processing priority of the first task satisfies a set execution condition based on the processing priority parameter, control the target core to process the first task with priority.

14. A non-transitory computer-readable storage medium, containing a computer program that when being executed, causes at least one processor to perform:

obtaining an identifier for a first task;

based on the identifier for the first task, obtaining target cache parameters of the first task corresponding to all cores of a processor, wherein a target cache parameter characterizes a quantity of cached data items of the first task in a cache unit corresponding to a core, the cache unit corresponding to each core comprises a plurality of cache regions, each cache region storing an identifier of a task to which the cache region belongs, and the quantity of cached data items of the first task in the cache unit corresponding to the core is a quantity of cache regions, in the cache unit corresponding to the core, that store the identifier for the first task; and based on the target cache parameters corresponding to all cores, selecting a target core from all cores to process the first task.

15. The storage medium according to claim 14, wherein the at least one processor is further configured to:

in response to a plurality of first cores of multiple first cores of the processor being in an idle state, select the plurality of idle state first cores from the multiple first cores as a plurality of cores, wherein a cache unit corresponding to a first core includes cache data of the first task.

16. The storage medium according to claim 15, wherein the at least one processor is further configured to:

in response to none of the multiple first cores of the processor being in an idle state, select a second plurality of first cores, with first performance parameters satisfying a performance requirement of the first task, from the multiple first cores as the plurality of cores.

17. The storage medium according to claim 16, wherein the at least one processor is further configured to:

based on the target cache parameters of the first task corresponding to all cores, select a core with a target cache parameter corresponding to a largest quantity of the cached data items from all cores as the target core.

18. The storage medium according to claim 17, wherein the at least one processor is further configured to:

obtain a second performance parameter of the core with the target cache parameter corresponding to the largest quantity of the cached data items and a second performance parameter of each of a plurality of second cores in the processor, wherein the plurality of second cores are selected from the processor based on a performance scheduling strategy, a first performance parameter of each second core satisfies the performance requirement of the first task, the second performance parameter is different from the first performance parameter, wherein performance characterized by the second performance parameter of the core with the target cache parameter corresponding to the largest quantity of the cached data items is better than performance characterized by the second performance parameter of each second core.

19. The storage medium according to claim 14, wherein the at least one processor is further configured to:

obtain a processing priority parameter of the first task; and in response to a determination that the processing priority of the first task satisfies a set execution condition based on the processing priority parameter, control the target core to process the first task with priority.

* * * * *